G. S. GUMAER.
AUTOMATIC SIGNALING DEVICE.
APPLICATION FILED MAY 9, 1916.
1,223,965.
Patented Apr. 24, 1917.
2 SHEETS—SHEET 1.
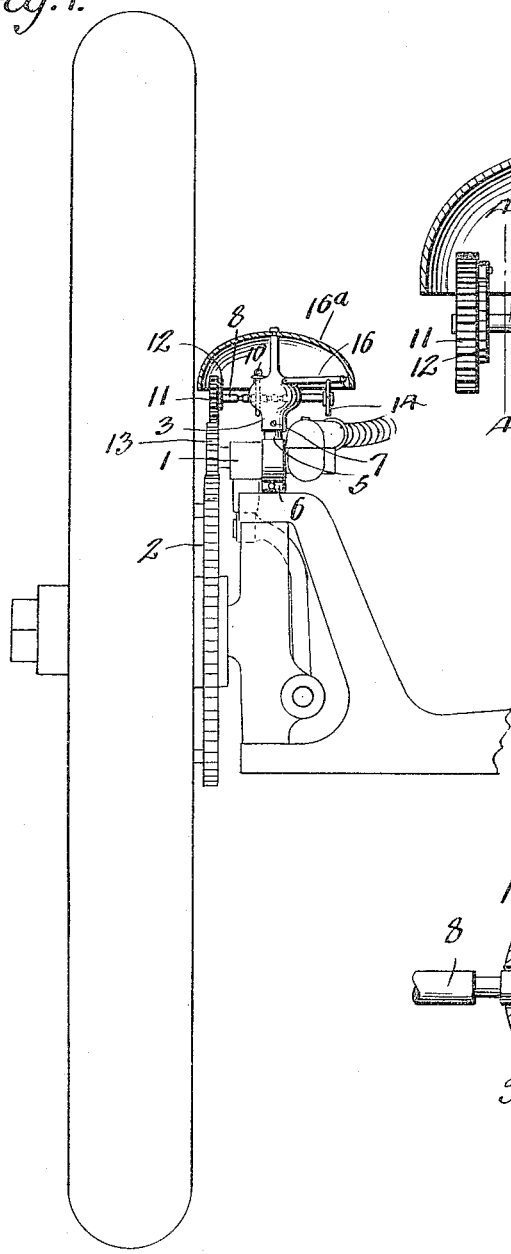
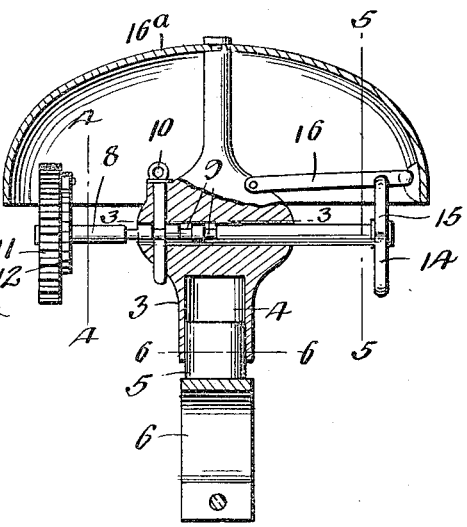
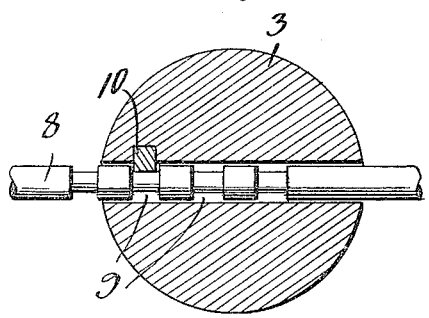
Witnesses
Inventor
G. S. Gumaer,
By Victor J. Evans
Attorney G. S. GUMAER.
AUTOMATIC SIGNALING DEVICE.
APPLICATION FILED MAY 9, 1916.
1,223,965.
Patented Apr. 24, 1917.
2 SHEETS—SHEET 2.
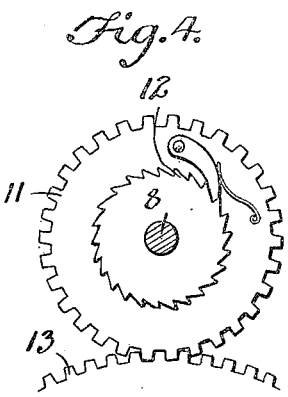
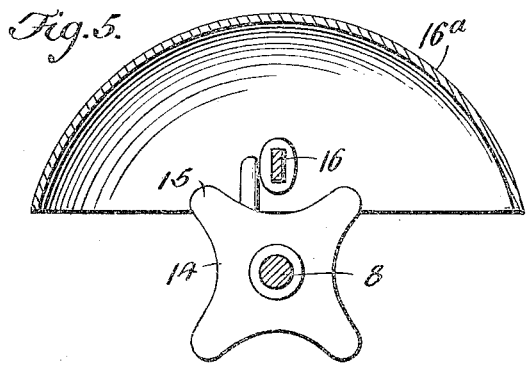
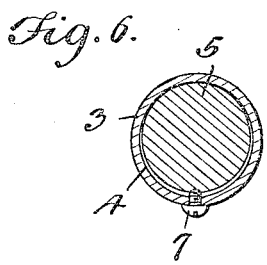
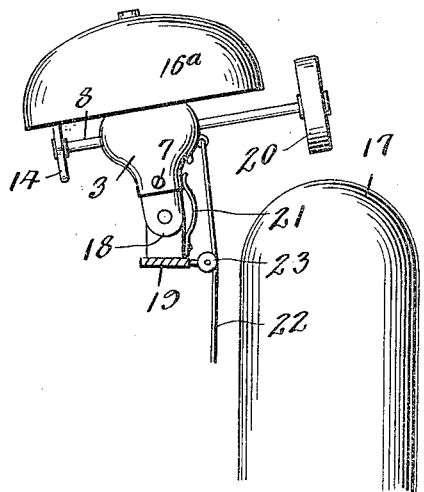
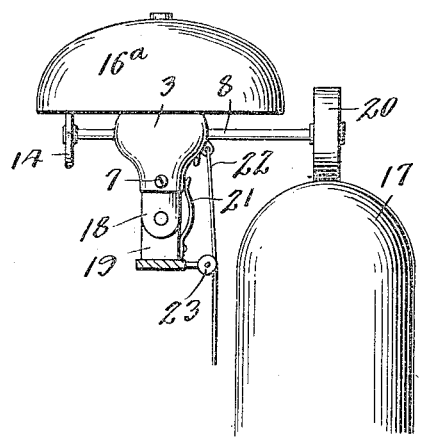
Witnesses
Inventor
G. S. Gumaer,
By Victor J. Evans
Attorney

UNITED STATES PATENT OFFICE.

GEORGE S. GUMAER, OF CORONADO, CALIFORNIA.

AUTOMATIC SIGNALING DEVICE.

1,223,965.  Specification of Letters Patent.  Patented Apr. 24, 1917.

Application filed May 9, 1916. Serial No. 96,458.

*To all whom it may concern:*

Be it known that I, GEORGE S. GUMAER, a citizen of the United States, residing at Coronado, in the county of San Diego and State of California, have invented new and useful Improvements in Automatic Signaling Devices, of which the following is a specification.

This invention relates to a signaling device and more particularly to a signaling device adapted to be attached to a vehicle by means of which audible signals will be given when the vehicle starts to move in a predetermined direction.

The primary object of the invention is the novel manner of mounting the device so as to receive this energy from a movable portion of the vehicle.

Another object of the invention is the manner of mounting the elements so that the device may be readily attached to different makes of vehicles.

For the purpose of illustration I will show my device applied to an automobile, but I wish it to be understood at the start that the device may be sold as a unitary article capable of being driven in any manner whatsoever.

The invention will be better understood from the following detailed description taken in connection with the accompanying drawings wherein a preferred embodiment is illustrated and the features of novelty including all the above mentioned and various others will be hereinafter pointed out in the appended claims.

In the drawings:

Figure 1 is a view of a portion of a vehicle showing my invention applied thereto.

Fig. 2 is a vertical sectional view.

Fig. 3 is a horizontal sectional view on the line 3—3 of Fig. 2.

Fig. 4 is a sectional view on the line 4—4 of Fig. 2.

Fig. 5 is a sectional view on the line 5—5 of Fig. 2.

Fig. 6 is a section on the line 6—6 of Fig. 2.

Fig. 7 is a diagrammatic view of a modification of my invention in one position.

Fig. 8 is a similar view of the mechanism illustrated in Fig. 7 showing the device in another position.

Referring to the drawings and more particularly to Figs. 1 to 6 inclusive, I have shown my invention supported by the bearing 1 of the speedometer drive mechanism 2, but I wish it to be understood that the same could be just as readily supported by the body of the vehicle in close proximity to one of the axles so that the elements to be described later may receive motion. The numeral 3 designates a bracket formed with a recess 4 that receives the tubular extension 5 of a clamp 6 which encircles the bearing 1, relative movement between the bracket and clamp being prevented by means of a set screw 7. Journaled in the bracket 3 is a shaft 8 formed at an intermediate point with a series of grooves 9 the walls of which are adapted to coöperate with a bolt or pin 10 held stationary within the bracket. Thus it will be seen that when the wall of a groove is engaged by the pin lengthwise movement of the shaft 8 will be prevented but rotary motion thereof accommodated. Loosely mounted upon one end of the shaft 8 is a gear 11 having a pawl and ratchet connection 12 with the shaft with the result that the gear 11 may turn in one direction without actuating the shaft 8. In this particular instance the gear 11 is shown in mesh with the gear 13 of the speedometer mechanism, but I wish it to be understood that a separate gear may be secured to a wheel for transmitting motion to the gear 11.

The purpose of the adjusting feature between the bracket 3 and the clamp 6 and between the shaft 8 and the bracket 3, is to accommodate different sized gears 13 and the proper spacing of the sound creating element relative to portions of the vehicle.

The other end portion of the shaft has fixedly mounted thereon a wheel 14 having a mutilated peripheral surface 15 which engages a yieldable striker 16 pivotally mounted upon bracket 3 and moves said striker up and down, said striker being adapted to strike a projection of the gong 16ª. The wheel 15, the element that actuates the striker 16 may be of any configuration such as a ratchet wheel, a star wheel or a mutilated gear depending entirely upon the movements to be given the striker 16.

In the modified form of my invention illustrated in Figs. 7 and 8, the elements of my invention are so arranged that the device may be actuated by contact with a movable element shown in this particular instance as a tire of a wheel 17 which may be a bicycle wheel. The bracket 18 in this particular instance is pivotally connected to a support 19 that in turn may be secured to any convenient part of the vehicle. The rest of the elements of the device are identical to that described with the exception that the gear 11 is dispensed with and a wheel 20 rigidly secured to the shaft and arranged to be thrown in engagement with the peripheral surface of the tire when the bracket is rotated about its pivot in a manner now to be described.

Constantly tending to incline the bracket to one side of its pivot so that the wheel 20 is normally out of engagement with the tire is a spring 21, and for moving the bracket in opposition to the spring 21 I provide a flexible element 22 passing around a pulley 23 and extending to a point in convenient reach of the operator of the vehicle.

It is to be understood that the structural embodiment of the invention as a whole and its various features as shown is merely illustrative and not restrictive since I am well aware that many of the details of construction can be widely varied without departing from the spirit of the invention. I therefore do not desire to be limited in these particulars or in any others except as set forth in the appended claims.

What I claim is:—

1. In a signal device for vehicles, a bracket, a gong mounted on said bracket, a shaft journaled in said bracket, a series of annular grooves in said shaft, a transverse hole in said bracket communicating with the journal of said shaft, a pin adapted to be inserted into said hole and to engage any one of said annular grooves to secure said shaft in its longitudinal adjustments, a clapper pivoted upon said bracket, an element mounted on said shaft adapted to actuate said clapper when said shaft is rotated, and means for rotating said shaft.

2. In a signal device for vehicles, a clamp, a bracket mounted on said clamp for rotational adjustment, means for securing said bracket in any adjustment respecting said clamp, a shaft journaled in said bracket at right angles to the axis of said bracket, means for adjusting said shaft longitudinally in said bracket, a clapper pivoted on said bracket, an element mounted on said shaft adapted to actuate said clapper when said shaft is rotated, a gong mounted on said bracket and adapted to be contacted by said clapper, and a means for driving said shaft.

3. In a signal device for vehicles, a clamp, a bracket mounted on said clamp for rotational adjustment, means for securing said bracket in any adjustment respecting said clamp, a shaft journaled in said bracket at right angles to the axis of said bracket, a series of annular grooves in said shaft, a transverse hole in said bracket communicating with the journal of said shaft, a pin adapted to be inserted into said hole and to engage any one of the said annular grooves to secure said shaft in its longitudinal adjustments, a clapper pivoted on said bracket, an element mounted on said shaft adapted to actuate said clapper when said shaft is rotated, a gong mounted on said bracket and adapted to be contacted by said clapper, and means for driving said shaft.

In testimony whereof I affix my signature.

GEORGE S. GUMAER.

Witnesses:
W. W. DANN,
FRED O. DORRIS.

Copies of this patent may be obtained for five cents each, by addressing the "Commissioner of Patents, Washington, D. C."